E. H. JONES.
ELECTRICAL METHOD OF WELDING.
APPLICATION FILED FEB. 26, 1914.
1,101,447.
Patented June 23, 1914.
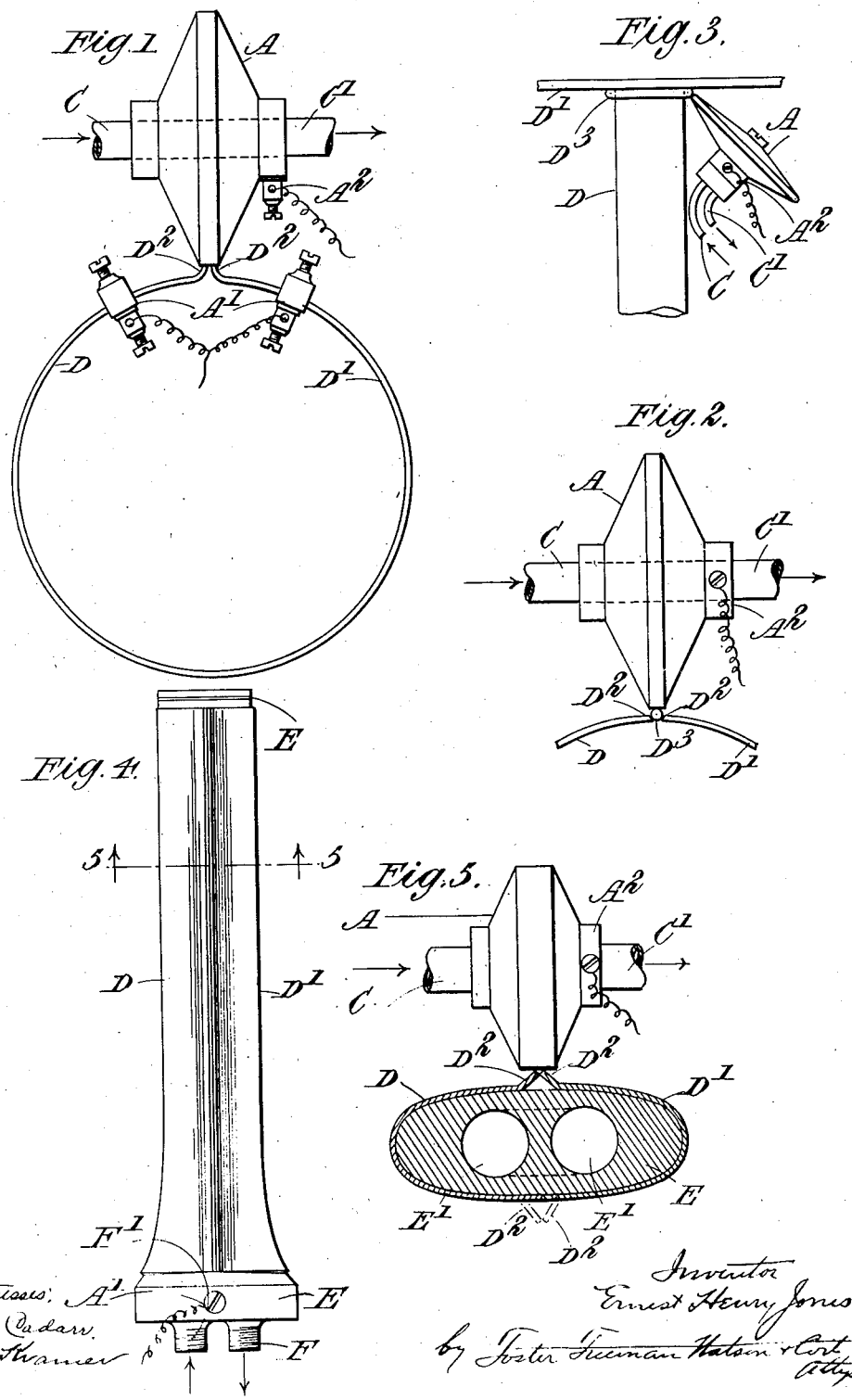

UNITED STATES PATENT OFFICE.

ERNEST HENRY JONES, OF LONDON, ENGLAND.

ELECTRICAL METHOD OF WELDING.

1,101,447.  Specification of Letters Patent.  Patented June 23, 1914.

Application filed February 26, 1914. Serial No. 821,197.

*To all whom it may concern:*

Be it known that I, ERNEST HENRY JONES, a subject of the King of England, residing at London, England, have invented certain new and useful Improvements in Electrical Methods of Welding, of which the following is a specification.

This invention is for an improved electrical method of welding which is cheaper and at the same time more efficient and convenient than existing methods.

One feature of the present invention consists in a method of welding which comprises connecting up the work to one terminal of an electrical circuit, connecting a single welding roller to the other terminal, circulating cooling fluid through the roller and supplying a low voltage current (for example of two volts) to the electrical circuit while pressing the roller on the work.

It is known in electrical methods of welding to connect the work and a single roller-electrode in series also it has also been proposed to use a current of low voltage for welding; further it has been proposed to pass the work between water cooled roller-electrodes, but the method set forth above embodies all the useful features of these known systems in such a way as to produce new and useful results.

Other features of the invention will be more particularly described hereinafter, and reference is now directed to the accompanying drawings, wherein the invention is illustrated.

In these drawings—Figure 1 is an elevation showing a welding apparatus arranged in its operative position relative to an article to be welded; Fig. 2 is a fragmentary view showing one way in which welding may be effected; Fig. 3 is a view of another welding apparatus and a method of using the same; Fig. 4 is an elevation showing the parts of a tubular spoke in position on a mandrel for welding, and Fig. 5 is a view, on a larger scale than Fig. 4, showing the mandrel and the parts of the spoke in section on the line 5—5 Fig. 4, and also showing a welding apparatus in operative position.

Like letters of reference refer to like parts throughout the accompanying drawings.

In carrying out the method of welding according to the present invention the parts D, D¹ to be welded (herein termed the "work"), which in Fig. 1 are parts of one homogeneous strip, but in the remaining figures are separate and distinct parts, are connected to one terminal of an electrical circuit. In Fig. 1, joint terminals A¹ are shown; these terminals are connected in parallel and the part D is connected to one and the part D¹ to the other. This method may also be adopted in Figs. 2 and 3. The other terminal A² of this circuit is connected to a single welding roller-electrode A which is carried on a support which may either be hand- or machine-controlled as desired. It is very necessary that the roller should be efficiently cooled if good results are to be obtained; for this purpose therefore the roller-electrode A is traversed internally by a current of cooling fluid which passes through the pipes C, C¹.

The electric current traversing the circuit, of which the parts A¹ and A² are the terminals, is of a low voltage, conveniently about two volts, but the amperage is large and may be varied as desired in accordance with the nature of the material being welded. By operating at a low voltage much better results can be obtained than is possible with a higher voltage.

To effect the weld, the roller-electrode A is brought into contact with the two edges to be welded, whereupon the electrical circuit within which these parts are included will be completed. When the current passes and suitable pressure is exerted on the roller B the edges of the parts D, D¹ which are in contact with the roller-electrode, will be raised to a welding heat and thus can be pressed into a welded joint whereupon the welding heat will cease until the tool be moved to a fresh point where resistance to the current produces the resultant heating until a fresh weld or a continued weld is established. Since the amount of current passing through the circuit is under control, the temperature to which the metal is heated may easily be adjusted so that any required degree may be obtained. Wide or narrow edges may be welded together, the roller-electrode being traversed along the edges as desired, or alternatively the roller-electrode may be held stationary and the parts to be welded be traversed in relation thereto until the weld is effected. To assist in forming the weld the edges D² to be welded should be provided with a strip of surplus material. Conveniently they may be turned up as shown in Fig. 1, or beads may be formed thereon for the same purpose; or alternatively a glutting strip D³ (see Figs. 2 and 3) of any suitable metal may be laid along the edges to be welded. The electric current passing through the roller A will cause this glutting strip and the edges of the parts D D¹ to be raised to a welding heat till the pressure of the roller will have forced them into an integral joint. The use of a glutting strip, or a beaded or turned up edge, as just described, is not new and is not claimed broadly in the present specification.

In Fig. 3 the parts D, D¹ to be welded are respectively a tube and a flat strip. A ring of wire D³ is laid into the angle formed by these two parts, after which the application of electric current and pressure from the welding roller will raise the three parts to the welding heat and solidly weld them together.

The method described above in which a single welding roller is used is specially advantageous in cases where hollow, curved or irregular articles have to be welded and where the pressure of say a current-transmitting roller cannot be counteracted by say a current-receiving roller situated on the opposite side of the parts to be welded. In some cases it is possible to use a mandrel on which to support the articles to be welded. This method of welding is illustrated in Figs. 4 and 5. In these figures the manufacture of tubular spokes is illustrated, but it is to be understood, of course, that the same method can be used in connection with any other similar articles. A mandrel E is employed through which a cooling fluid is circulated by pipes F, F¹ and the conduits E¹. The mandrel is shaped on its exterior to the final shape which it is desired that the spokes or other articles shall assume, and the spoke or tube elements D, D¹ having been brought to their required shape are placed around the mandrel and held thereon by any suitable clamps (not shown). The tube elements D, D¹ are shown as being halves of the complete tube. Either the elements D, D¹ or the mandrel E are connected to one terminal of an electric circuit to the other terminal A² of which the welding roller A, see Fig. 5, is connected. In Fig. 4 the mandrel E is shown as carrying the terminal A¹, the tube elements making electrical contact with the mandrel. The tube elements D, D¹ before they are placed on the mandrel are formed with outwardly-turned angularly-disposed longitudinal edges D². These edges D² are not turned up substantially at right angles as is shown on Fig. 1 but are so arranged that when the shaped tube elements D, D¹ are placed in position on the mandrel, the edges D² will converge and touch as shown in Fig. 5. In this figure the welding operation is assumed to have been completed along one side of the mandrel, the chain lines representing the positions originally occupied by the edges D² on this finished side.

The method of operation described above in connection with the preceding figures is followed in connection with the arrangements shown in Figs. 4 and 5. The angularly-disposed converging edges D² shown in Fig. 5, however, have very many advantages in the cases where a mandrel can be employed. It is found that as the welding is proceeding and the roller A is pressed down upon the edges D², these latter working one into the other form a very neat and even joint, as compared with other methods which often only produce an irregular and unsightly joint.

It will be seen that both the roller A and the mandrel E are positively cooled, and since only a low voltage current is to be employed, the method of welding illustrated in Figs. 4 and 5 will be both cheap and efficient.

What I claim as my invention and desire to secure by Letters Patent is:—

1. The herein described method of forming tubes by electric welding from elements having outwardly turned, angularly disposed longitudinal edges, comprising supporting two of such elements with their adjacent edges converging and touching, connecting said elements to one terminal of an electric circuit, connecting a single welding roller to the other terminal of the circuit, circulating a cooling fluid through the roller, and supplying a low voltage current to the electrical circuit while pressing the roller on the converging edges of the tube elements.

2. The method of forming tubes by electric welding consisting in forming tube elements with outwardly-turned angularly-disposed longitudinal edges, placing such shaped tube elements in position on a tubular mandrel with the adjacent edges of the tube elements converging and touching, connecting the tube elements to one terminal of an electrical circuit, connecting a single welding roller to the other terminal, circulating a cooling fluid through the roller and through the mandrel, and supplying a low voltage current to the electrical circuit while pressing the roller on the said outwardly-turned convergent edges of the tube elements.

3. The method of forming tubes by electric welding consisting in forming tube-halves with outwardly-turned angularly-disposed longitudinal edges, placing a pair of such shaped tube-halves in position on a tubular mandrel with their adjacent edges converging and touching, connecting the tube-halves to one terminal of an electrical circuit, connecting a single welding roller to the other terminal, circulating a cooling fluid through the roller and through the mandrel, and supplying a low voltage current to the electrical circuit while pressing the roller on the said outwardly-turned convergent edges of the tube-halves.

4. The method of forming tubes by electric welding consisting in forming tube elements with outwardly-turned angularly-disposed longitudinal edges, placing such shaped tube elements in position on a tubular mandrel in electrical contact therewith with the adjacent edges of the tube elements converging and touching, connecting the mandrel to one terminal of an electrical circuit, connecting a single welding roller to the other terminal, circulating a cooling fluid through the roller and through the mandrel, and supplying a low voltage current to the electrical circuit while pressing the roller on the said outwardly-turned convergent edges of the tube elements.

In testimony whereof I have signed my name to this specification in the presence of two subscribing witnesses.

ERNEST HENRY JONES.

Witnesses:
W. E. ROGERS,
O. J. WORTH.